(12) United States Patent  
Segato

(10) Patent No.: US 7,611,194 B2
(45) Date of Patent: Nov. 3, 2009

(54) SEAT STRUCTURE, PARTICULARLY FOR BICYCLE, HAVING A CUSTOMIZABLE SHOCK ABSORBING ELEMENT BETWEEN THE SHELL

(75) Inventor: Stefano Segato, Vicenza (IT)

(73) Assignee: Selle Royal SpA, Pozzoleone (IT)

( * ) Notice: Subject to any disclaimer, the term of this patent is extended or adjusted under 35 U.S.C. 154(b) by 0 days.

(21) Appl. No.: 11/913,552

(22) PCT Filed: May 8, 2006

(86) PCT No.: PCT/IB2006/051431

§ 371 (c)(1),
(2), (4) Date: May 4, 2008

(87) PCT Pub. No.: WO2006/120630

PCT Pub. Date: Nov. 16, 2006

(65) Prior Publication Data

US 2008/0217968 A1    Sep. 11, 2008

(30) Foreign Application Priority Data

May 6, 2005    (IT)    ................................ 2005A0136

(51) Int. Cl.
*B62J 1/00*    (2006.01)
(52) U.S. Cl. .................................................. 297/195.1
(58) Field of Classification Search .............. 297/195.1, 297/214, 200, 452.27, 452.28, 219.11
See application file for complete search history.

(56) References Cited

U.S. PATENT DOCUMENTS 4,753,480 A * 6/1988 Morell .................. 297/452.27
5,348,369 A * 9/1994 Yu .............................. 297/214
6,022,073 A * 2/2000 Yates .......................... 297/214
6,443,524 B1   9/2002 Yu
6,687,934 B1 * 2/2004 Liao .............................. 5/654
6,860,551 B1 * 3/2005 Chi ............................. 297/200
2002/0093230 A1   7/2002 Bigolin
2005/0029842 A1   2/2005 Martin et al.

FOREIGN PATENT DOCUMENTS

IT    1248202    1/1995

* cited by examiner

*Primary Examiner*—Milton Nelson, Jr.
(74) *Attorney, Agent, or Firm*—Themis Law

(57) ABSTRACT

The present invention finds application in the field of sport and leisure accessories, and particularly relates to a seat structure having controlled and customizable elasticity, particularly for vehicles. The structure, which is designed to be connected to a movable or stationary frame, includes a support element having a bottom surface and a top surface, which is designed to support at least partly a user, a connection member to be associated to the support element for anchorage thereof to the movable or stationary frame, and at least one shock absorbing element, which is designed to absorb shocks and vibrations transmitted from the frame to the support element. The shock absorbing element includes an elastic member, which has a first elasticity modulus, and which is provided between the bottom surface of the support element and the connection member. Moreover, the elastic member has at least one seat for a corresponding insert, which has a second elasticity modulus, and which may be added by a user to control and selectively adjust the overall elasticity of the shock absorbing element.

19 Claims, 3 Drawing Sheets

SEAT STRUCTURE, PARTICULARLY FOR BICYCLE, HAVING A CUSTOMIZABLE SHOCK ABSORBING ELEMENT BETWEEN THE SHELL

FIELD OF THE INVENTION

The present invention finds application in the field of sport and leisure accessories, and particularly relates to a seat structure having controlled and customizable elasticity.

BACKGROUND OF THE INVENTION

Seating structures, such as bicycle saddles or car seats, are known to be designed to meet structural strength and compactness needs, in addition to user comfort and convenience requirements.

In view of the above, a variety of solutions have been proposed to add comfort to such structures. For example, the seats have pads of resilient materials, such as sponge, foam, polyurethane foam or gel. Furthermore, they may have lower spring members or the like, to oppose the user's weight and to absorb any shock or abrupt oscillation.

An apparent limitation of such solutions is that the user is almost totally unable to adjust the resilience of elastic members as desired, thereby customizing the shock absorbing properties of the whole structure.

In an attempt to obviate such drawback, certain solutions have been proposed to solve the above technical problem.

U.S. Pat. No. 6,007,149, which forms the basis of the preamble of claim 1, discloses a bicycle saddle having a plurality of replaceable elastomeric elements between the shell and the cover element, to increase or decrease the resilience of the saddle pad.

This prior art solution has the apparent drawback that the elastomeric elements are placed almost in direct contact with the ischial region of the user, thereby causing discomfort.

During normal use of the saddle, the user tends to move, thereby causing the elastomeric elements to slide relative to each other, and take improper and unnatural positions.

Moreover, this configuration has a reduced ability to absorb shocks and abrupt oscillations associated to the normal use of the seat.

From IT-B1-1248202 it is known a seat structure having all the features of the preamble of the main claim 1. In particular, this known seat structure comprises a shock absorbing member having an insert that a user may introduce to control and selectively adjust the overall elasticity of the shock absorbing member.

Unfortunately, the introduction of the insert is very difficult, thus dramatically affecting the efficiency of the shock absorbing member and the integrity of the whole seat structure.

SUMMARY OF THE INVENTION

The object of this invention is to overcome the above drawbacks, by providing a support structure that is highly efficient and relatively cost-effective.

A primary object is to provide a seat structure in which the shock and oscillation absorption properties may be adjusted, and a high user comfort is assured.

Another object is to provide a seat structure that is comfort even after many hours of use.

These and other objects, as better explained hereafter, are fulfilled by a seat structure with controlled and customizable elasticity in accordance with claim 1.

Thanks to this embodiment, the desired inserts may be readily inserted, without removing the shock absorbing element from the structure, and without affecting thereby its integrity and efficiency.

Preferably, the first elastic material has a first elasticity modulus and the second material has a second elastic material has a second elasticity modulus.

This particular configuration of the invention provides structure with adjustable shock absorbing properties, which may be promptly and easily customized to the specific needs of each user.

Furthermore, by placing the shock absorbing element between the bottom surface of the support element and the connection member, the structure of the invention will provide a high user comfort, while maintaining the integrity of the seat.

Suitably, the seats may be formed on the external surface of the elastic member, and may consist of at least one through or blind hole.

Advantageously, each insert may be complementary in shape to the corresponding seat in which it is to be inserted.

Thanks to this particular configuration, the additional shock absorbing elements may be perfectly integrated to the main elastic member and are highly stable therein. Also, they can be inserted in a very simple manner.

In accordance with a further configuration of the invention, the elastic member may be at least partly hollow. In this case, the seat is formed therein and accessible from the outside, for instance, through a slit formed on the external surface of such member. According to such configuration, the insert is introduced in its seat after total or partial removal of the elastic member from the interspaces between the bottom surface of the support element and the connection member.

Advantageously, the support element and the connection member may be conformed with a substantially elongate shape, with parallel longitudinal axes. The support element may further have a widened rear portion for supporting a seated user.

Thus, the elastic member may be introduced at the rear portion and be shaped as a spherical segment having an axis substantially centered on the above mentioned longitudinal axes.

Conveniently, the elastic member may have a substantially flat larger base, which is designed to come in contact with the support element, and a smaller base, also having a flat shape, lying on the connection member.

Thanks to these additional features, the shock absorbing element will evenly support the whole support element, thereby providing an optimized distribution of the load acting on the whole structure, and a more homogeneous absorption of the shocks associated to the use thereof. The particular conformation of the element will further. provide a high visual uniformity of the whole structure, thereby affording an apparent aesthetic advantage.

Furthermore, the smaller base of the elastic member may have an axial longitudinal recess for engagement with a corresponding longitudinal projection formed on the connection member, to prevent any transverse motion of the elastic member.

Preferably, additional elastic means are provided on the elastic member, for snap fit connection to the support element.

Finally, the connection member may have substantially plate-like connecting portions with lateral holes for the passage of screws for anchorage to the elastic member.

These features of the invention considerably improve the stability of the elastic member within the structure, and further afford a more stable connection of the elastic member with both the support element and the connection member.

According to another aspect of the invention, the insert may include a plurality of members that are substantially symmetrical with respect to a vertical median plane along the above mentioned longitudinal axes. This will allow shock absorption in several different areas of the structure.

On the other hand, the insert may have a substantially horseshow arch plan shape, to provide uniform shock absorption all over the structure.

BRIEF DESCRIPTION OF THE DRAWINGS

Further features and advantages of the invention will be more apparent from the detailed description of a preferred, non-exclusive embodiment of a seat structure according to the invention, which is described as a non-limiting example with the help of the annexed drawings, in which.

DETAILED DESCRIPTION OF A PREFERRED EMBODIMENT

The seat structure of the invention is designed to support a seated user, and may have the form, for example, of a car seat, a chair or a bicycle saddle, as shown in the annexed figures.

Figure 1:
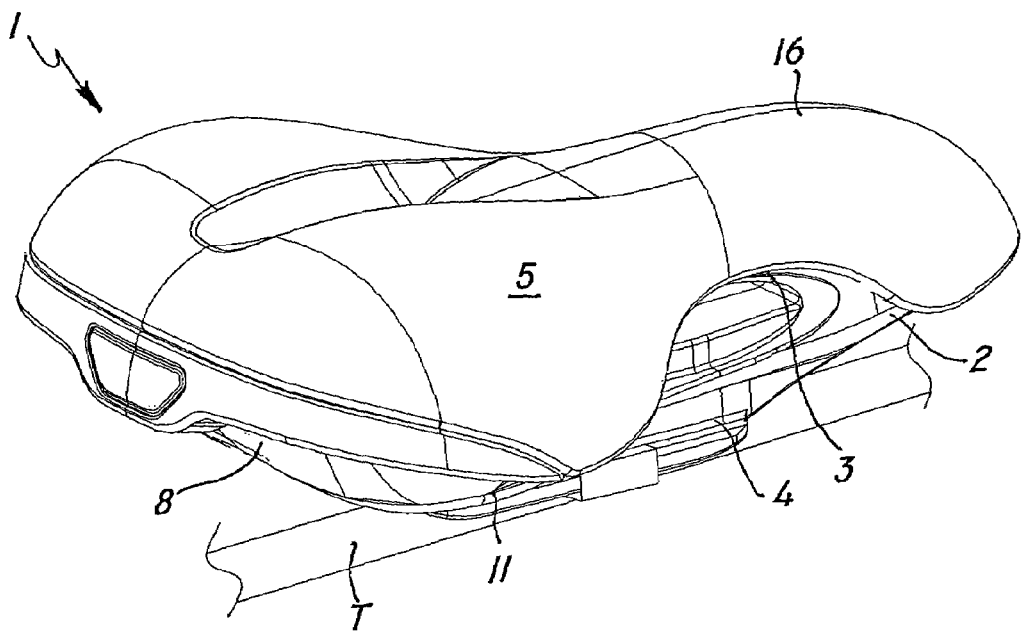
FIG. 1 is an axonometric view of structure according to the invention.
Figure 2:
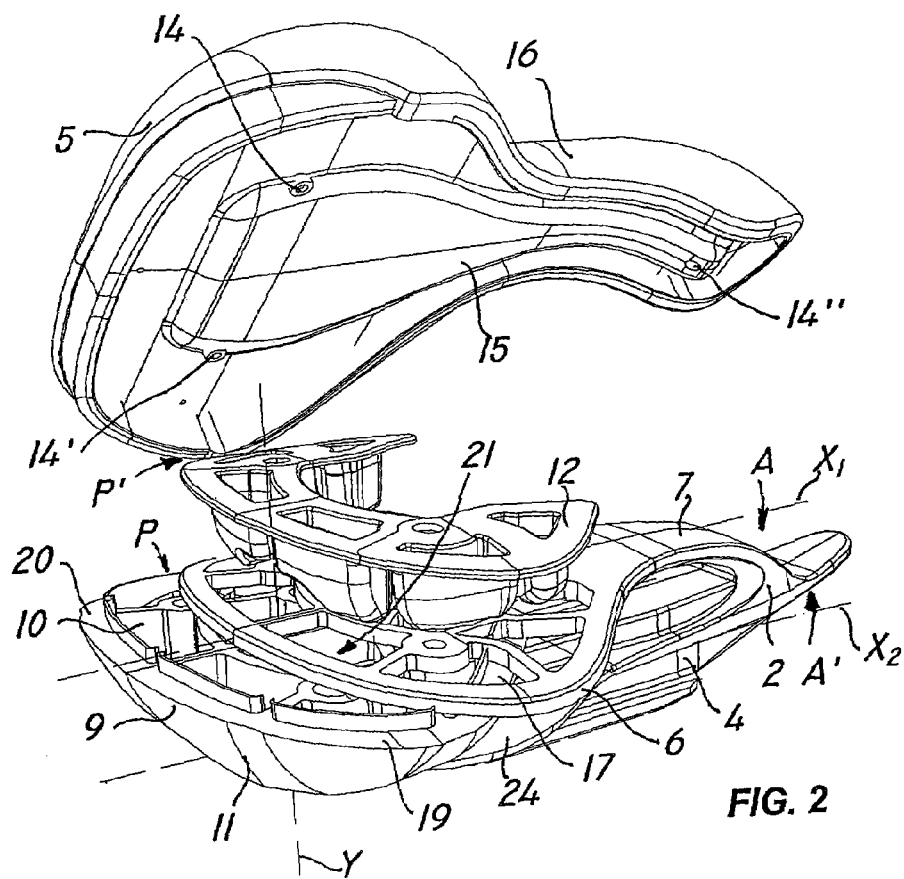
FIG. 2 is an exploded view of a particular configuration of the structure of FIG. 1.

As shown in FIGS. 1 and 2, the structure of the invention, overall designated with numeral 1, comprises, in a typical embodiment, a shell 2, which is composed of an upper support element 3 and an underlying connection member 4. The element 4 has the purpose of providing the connection with a movable or stationary frame T.

In accordance with a typical embodiment, an upper cover 5 is further provided, which is joined to the support element 3 and is designed to come in contact with the seated user.

The upper element 3 has in turn a downwardly facing bottom surface 6 and a top surface 7 for supporting the user's weight.

According to a preferred, non exclusive embodiment of the invention, the support element 3 and the connection member 4 are connected at one of their free ends, for example, as particularly shown in FIG. 2, at their respective front portions A, A'. An interspace i is thus defined between the bottom surface 6 of the support element 3 and the connection member 4.

Preferably, the support element 4 and the connection member 4 have an elongate shape, with substantially parallel longitudinal axes $X_1$, $X_2$.

Furthermore, the support element 3 is widened at its rear portion P, for properly fitting the seated position of the user.

The elements 3 and 4, conventionally known as "shell" and "fork" may be joined together by normal fastening means, such as tapping screws, nut and screw assemblies or by welding or interference fit. Nevertheless, they are preferably formed of one piece, as shown in the figures.

Advantageously, these elements 3 and 4 may be made of a rigid or semi-rigid material, namely reinforced metal or polymer materials such as glass fiber-reinforced polyamide 66, but shall not be necessarily made of the same material. A number of methods, such as molding, may be used to form them.

The structure further comprises a shock absorbing element 8 for absorbing shocks and vibrations transmitted from the frame T to the overall structure, and associated to normal use of the vehicle.

According to the invention, the element 8 in turn comprises a body 9 in a first elastic material having a first elasticity modulus $k_1$, which is inserted in the above mentioned interspaces i.

Figure 3:
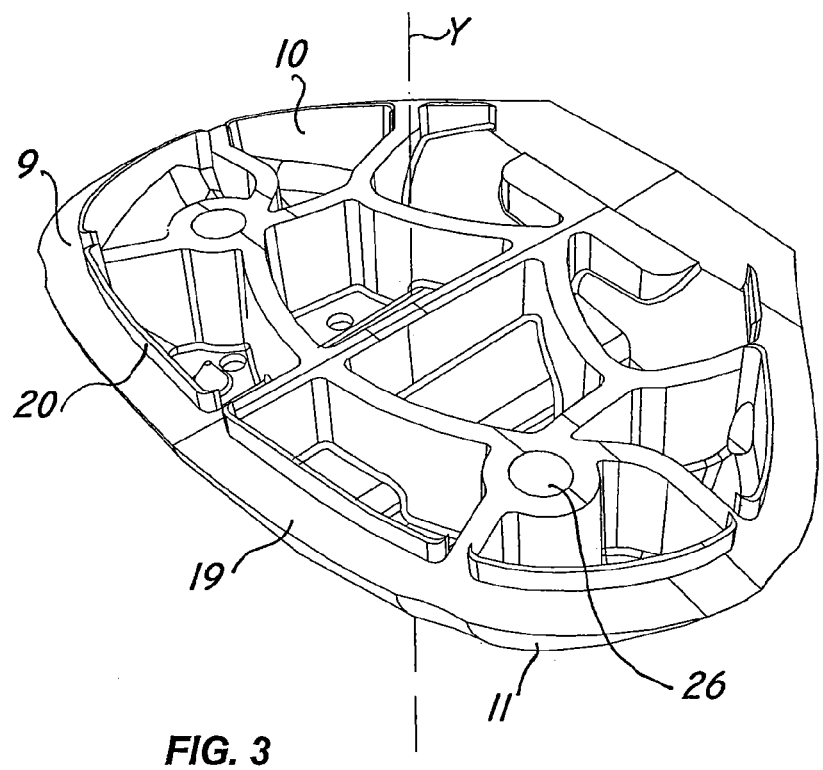
FIG. 3 is a first axonometric view of a detail of FIG. 1.
Figure 4:
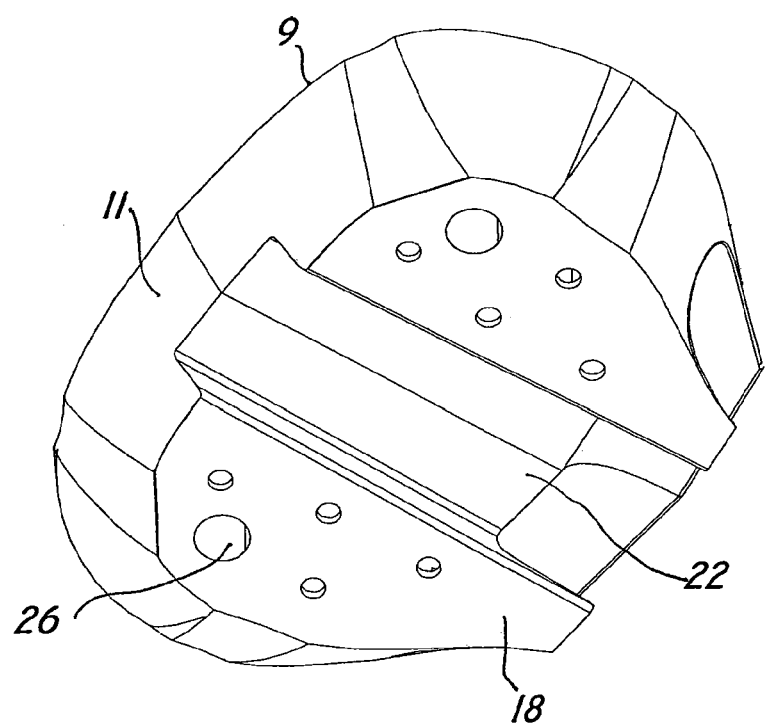
FIG. 4 is a second axonometric view of the detail of FIG. 3.

As particularly shown in FIG. 3, a number of seats 10 are defined in the elastic body 9, which are formed on the external surface 11 of the elastic body 9, in which each user may introduce a specific insert 12, characterized by a second elasticity modulus $k_2$, to customize the overall elastic response of the shock absorbing element.

The insert 12 is complementary in shape to its respective seat 10 and may have, in a first embodiment, as shown in FIG. 2, a horseshoe shape.

Figure 5:
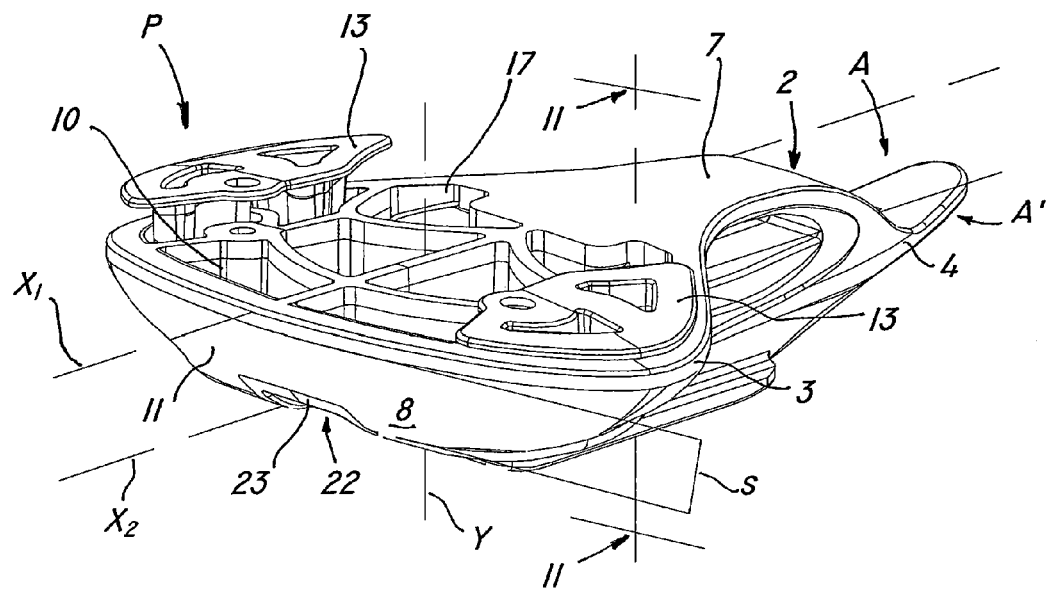
FIG. 5 is an axonometric view of a detail of FIG. 1 according to a second embodiment.
Figure 6:
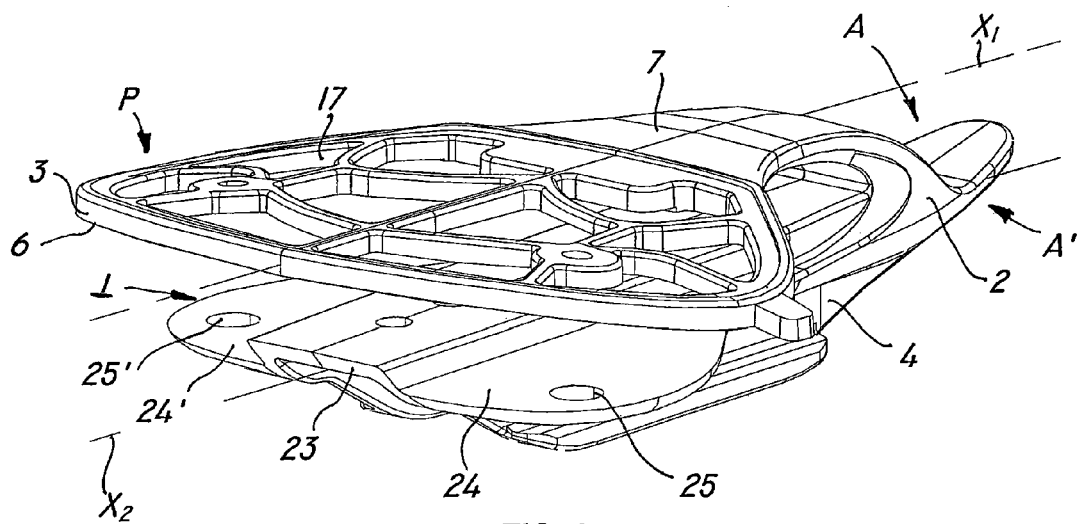
FIG. 6 is an axonometric view of a further detail of FIG. 1.

In accordance with a further embodiment of the invention, as shown in FIG. 5, the insert may be composed of two members 13, 13', to be inserted in the seats 10 in symmetrical positions with respect to a vertical median plane II-II passing through the longitudinal axes $X_1$, $X_2$. The members 13, 13' may or may not have the same elasticity modulus, amounting to $k_2$ in total.

The elastic body 9 and the inserts 12, 13, 13' may be made of a composite material or a thermoplastic elastomeric material, such as vulcanized rubber, polyurethane foam, gel or the like.

Preferably, but without limitation, they may be characterized by different elasticity moduli $k_1$, $k_2$.

The elastic body 9 may be formed using several different methods, such as molding or comolding with the shell 2, if the latter is integrally formed.

Advantageously, the upper cover 5 is removably connected to the support element 3 by ordinary connection means, such as one or more screws to be inserted in respective blind holes 14 formed in the underside thereof.

As shown in FIG. 2, the cover 5 has a lower element 15 and an upper cover 16 for contact with the user, which may both contain a resilient pad, made of foam, sponge, elastomeric material, gel or the like.

Suitably, apertures 17 are formed on the support element 3 at the same position as the seats 10 of the elastic body 9 to allow insertion of the inserts 12, 13, 13' after removal of the cover 5.

Advantageously, the elastic member 9 is placed at the rear portion P of the support element 3 and has a predetermined thickness s, which is not lower than the interspace i size in unloaded structure conditions.

Such member is substantially a spherical or cylindrical segment whose vertical axis Y is centered on the longitudinal axes $X_1$, $X_2$ of the upper element 3 and the connection member 4.

Conveniently, the body 9 has its smaller base 18 lying on the connection member 4 and its flat larger base 19 in contact with the bottom surface 6 of the support element 3.

Advantageously, as shown in FIG. 3, peripheral projections 20 are formed on the larger base 19 to improve connection with the surfaces 21 of the seats 10.

An axial recess 22 is further formed on the smaller base 18, whose longitudinal extension is designed to engage with a corresponding longitudinally extending projection 23, formed on the connection member 4.

Also, the latter has plate-like connecting portions 24, 24' formed on its sides. Through holes 25, 25' are formed in such portions for the passage of screws for anchorage to the element 15, through suitable holes 26 formed on the smaller base 18 thereof.

In an alternative embodiment, the element 8 may be composed of two or more cylindrical bodies 9 with inserts removably housed therein. The members 9 may be inserted between the bottom surface 6 of the element 3 and the top surface of the element 4, and held in position by a nut and screw assembly. Customization of the shock absorbing properties of the structures may be simply achieved by unscrewing the bodies 9, removing them from their seats, adding or removing the inserts therein and rescrewing them.

The above disclosure clearly shows that the structure of the invention fulfills the intended objects and particularly meets the requirement of customizing shock absorbing properties to the needs of each user, while providing high comfort.

This particular configuration provides Structure characterized by a high stability of the shock absorbing element, thereby having very high comfort properties.

The structure of the invention is susceptible of a number of changes and variants, within the inventive concept disclosed in the appended claims. All the details thereof may be replaced by other technically equivalent parts, and the materials may vary depending on different needs, without departure from the scope of the invention.

While the structure has been described with particular reference to the accompanying figures, the numerals referred to in the disclosure and claims are only used for the sake of a better intelligibility of the invention and shall not be intended to limit the claimed scope in any manner.

The invention clamed is:

1. A seat structure with controlled and customizable elasticity, particularly for vehicles, designed to be connected to a movable or stationary frame, comprising:
    a support element having a bottom surface and a top surface for supporting at least partly a user;
    a cover element, designed to contact at least partly the user, associable to said support element at the top surface of said support element;
    a connection member associable to said support element for anchorage thereof to said movable or stationary frame; and
    at least one shock absorbing element, which is designed to absorb shocks and vibrations transmitted from said frame to said support element, said shock absorbing element comprising:
        a body made of a first elastic material and located between the bottom surface of said support element and said connection member, said body having at least one seat; and
        an insert suitable to be placed in said at least one seat of said body, said insert being made of a second elastic material to control and selectively adjust overall elasticity of said shock absorbing element;
    wherein at least one aperture is formed in said support element at a same position as said at least one seat for insertion of said insert, said aperture being accessible from outside of the seat structure after removal of said cover element.

2. The structure as claimed in claim 1, wherein said first elastic material has a first modulus of elasticity and said a second elastic material has a second modulus of elasticity.

3. The structure as claimed in claim 2, wherein said first modulus of elasticity is different from said second modulus of elasticity.

4. The structure as claimed in claim 1, wherein said at least one seat is a through or blind hole, formed on an external surface of said body.

5. The structure as claimed in claim 1, wherein said insert is made of an elastomeric or composite material.

6. The structure as claimed in claim 1, wherein said body is at least partly hollow.

7. The structure as claimed in claim 1, wherein said insert is complementarily shaped with respect to the corresponding seat in which the insert is to be engaged.

8. The structure as claimed in claim 1, wherein said support element and said connection member have an elongate shape, and wherein said support element and said connection member have substantially parallel longitudinal axes.

9. The structure as claimed in claim 1, wherein said support element has a widened rear portion for supporting the user in a seated position, said elastic body being placed at said widened rear portion.

10. The structure as claimed in claim 9, wherein said body substantially has a shape of a spherical or cylindrical segment with a vertical axis substantially centered on longitudinal axes of the support element and of the connection member and further has a smaller base lying on said connection member.

11. The structure as claimed in claim 1, wherein said body has a larger base, which is designed to come in contact with said support element.

12. The structure as claimed in claim 1, wherein said body has a smaller base with an axial recess formed therein for engagement with a corresponding projection of said connection member to prevent any transverse motion of said body.

13. The structure as claimed in claim 1, wherein said connection member comprises generally flat connection portions with lateral holes to receive screws for anchorage to at least one lower element.

14. The structure as claimed in claim 1, wherein said elastic body has elastic connection means.

15. The structure as claimed in claim 1, wherein the insert comprises a plurality of members that are substantially symmetrical, with respect to a vertical median plane passing through longitudinal axes of the support and of the connection member.

16. The structure as claimed in claim 15, wherein said at least one shock absorbing element comprises at least a pair of substantially cylindrical bodies, symmetrical with respect to the vertical median plane passing through said longitudinal axes.

17. The structure as claimed in claim 15, wherein said insert comprises a plurality of members that are substantially symmetrical with respect to the vertical median plane passing through said longitudinal axes.

18. The structure as claimed in claim 15, wherein said shock absorbing element comprises at least a pair of substantially cylindrical bodies symmetrical with respect to the vertical median plane passing through said longitudinal axes.

19. The structure as claimed in claim 18, wherein said bodies have a plurality of substantially flat inserts disposed therein.

* * * * *